United States Patent
Mai et al.

(12) 
(10) Patent No.: US 11,322,779 B1
(45) Date of Patent: May 3, 2022

(54) ELECTROLYTE FOR LI SECONDARY BATTERIES

(71) Applicant: Umicore, Brussels (BE)

(72) Inventors: Sebastian Mai, Ilmenau (DE); Svetlozar-Dimitrov Ivanov, Ilmenau (DE); Andreas Bund, Ilmenau (DE)

(73) Assignee: UMICORE, Brussels (BE)

( * ) Notice: Subject to any disclaimer, the term of this patent is extended or adjusted under 35 U.S.C. 154(b) by 0 days.

(21) Appl. No.: 17/078,448

(22) Filed: Oct. 23, 2020

(51) Int. Cl.
*H01M 10/0567* (2010.01)
*H01M 10/0568* (2010.01)
*H01M 4/505* (2010.01)
*H01M 4/38* (2006.01)
*H01M 10/052* (2010.01)
*H01M 4/525* (2010.01)

(52) U.S. Cl.
CPC ....... *H01M 10/0567* (2013.01); *H01M 4/382* (2013.01); *H01M 4/505* (2013.01); *H01M 4/525* (2013.01); *H01M 10/052* (2013.01); *H01M 10/0568* (2013.01); *H01M 2300/0025* (2013.01)

(58) Field of Classification Search
CPC ......... H01M 10/0567; H01M 10/0568; H01M 10/0569; H01M 10/0525; H01M 2300/0025
See application file for complete search history.

(56) References Cited

U.S. PATENT DOCUMENTS

| 2018/0034105 A1* | 2/2018 | Ohashi | H01M 10/0525 |
| 2018/0108935 A1* | 4/2018 | Noguchi | H01M 10/0569 |

OTHER PUBLICATIONS

Kannan, Dhevathi Rajan Rajagopalan, et al., "Analysis of the Separator Thickness and Porosity on the Performance of Lithium-Ion Batteries", International Journal of Electrochemistry, vol. 2018, Article ID 1925708, 7 pages, 2018. https://doi.org/10.1155/2018/1925708.

* cited by examiner

*Primary Examiner* — Osei K Amponsah
(74) *Attorney, Agent, or Firm* — NK Patent Law

(57) ABSTRACT

An electrolyte composition suitable for lithium ion secondary batteries comprises lithium bis(trifluoromethansolfonyl) imide (LiTFSI), 1,1,2,2-tetrafluoro-ethyl-2,2,3,3-tetrafluoropropyl ether (TTE), sulfolane (SL) and fluoroethylene carbonate (FEC) in an amount (x) of $0 < x \leq 15$ vol. %. The composition comprises a molar ratio SL/LiTFSI (y) of $1.0 \leq y \leq 5.0$ and a molar ratio TTE/LiTFSI (z) of $1.0 \leq z \leq 5.0$. The electrolyte results in improved electrochemical properties.

20 Claims, 1 Drawing Sheet

ELECTROLYTE FOR LI SECONDARY BATTERIES

TECHNICAL FIELD

The present invention relates to an electrolyte composition for Li metal-based or lithium-ion batteries. In particular, the present invention relates to an electrolyte composition suitable for lithium secondary batteries, comprising lithium bis(trifluoromethansolfonyl)imide (LiTFSI), 1,1,2,2-tetrafluoroethyl-2,2,3,3-tetrafluoropropyl ether (TTE), sulfolane (SL) and fluoroethylene carbonate (FEC), as well as its application in a lithium secondary battery cell.

BACKGROUND

The three primary functional components of a lithium-ion battery are the anode, the cathode, and the electrolyte. The anode of a conventional lithium-ion cell is made from carbon, the cathode of transition metal oxides such as cobalt, nickel, manganese, and the electrolyte is a non-aqueous solvent containing a lithium salt. Other lithium-ion batteries, e.g. based on lithium iron phosphates cathodes, are also present on the market.

The electrolyte should conduct lithium ions, acting as a carrier between the cathode and the anode when a battery passes an electric current through an external circuit. Electrolyte solvents in current use decompose on initial charging and form a solid interphase layer, which is electrically insulating, yet provides sufficient ionic conductivity. This interphase prevents further decomposition of the electrolyte in subsequent charge/discharge cycles.

Such electrolyte solvents typically consist of a mixture of organic carbonates such as ethylene carbonate (EC), di-methyl carbonate (DMC) and propylene carbonate (PC) and the lithium salt normally consists of a hexafluorophosphate, $LiPF_6$. WO 2019/211353 A1 relates to a non-aqueous liquid electrolyte composition suitable for secondary battery cells, especially lithium-ion secondary battery cells. Such electrolyte composition comprises a) at least one non-fluorinated cyclic carbonate and at least one fluorinated cyclic carbonate, b) at least one fluorinated acyclic carboxylic acid ester, c) at least one electrolyte salt, d) at least one lithium borate compound, e) at least one cyclic sulfur compound, and f) optionally at least one cyclic carboxylic acid anhydride, all components being present in specific proportions. It can advantageously be used in batteries comprising a cathode material comprising a lithium nickel manganese cobalt oxide (NMC) or a lithium cobalt oxide (LCO), especially at a high operating voltage.

As the market of lithium secondary batteries is rapidly expanding and there is an increasing demand for smaller and lighter batteries, which are suitable for portable electronic devices and which show tremendous energy densities, led to intensive developments attempting to achieve safe and stable batteries with higher capacities and which are able to operate at high operating voltages.

The capacity of a battery for portable electronic devices has currently reached a plateau mainly due to electrolyte stability limiting the operating voltage. The operating voltage of commercial batteries suitable for portable electronic devices currently varies from 4.2V to maximum 4.4V. For very high-end portable electronic devices such as leading-edge mobile phones, batteries applying operating voltages of at least 4.4V (and preferably not more than 4.5V) are requested. Moreover, some electrolyte compositions for secondary Lithium ion battery cells have safety issues, i.e. being inflammable.

It is therefore an object of the present invention to provide a stable, safe, and high energy density battery exhibiting good cycle life (which can be for instance sufficient to high or excellent cycle life) enabled through a high coulombic efficiency (i.e. of at least 93%, preferably of at least 98%), preferably at a higher voltage range i.e. at a voltage higher than 4.4 V) versus conventional cut-off or operating voltages (limited to 4.4 V).

It is an objective to provide a Li-ion battery having higher energy density. Selecting lithium metal as anode allows for higher energy density, but causes problems, amongst others problems with poor cyclability due to low coulombic efficiency. It is an objective of the present invention to provide a Li-ion battery having higher energy density which does not suffer from poor cyclability.

This object has been solved by using a sulfolane (SL)-based electrolyte composition suitable for lithium secondary batteries, comprising lithium bis(trifluoromethansolfonyl)imide (LiTFSI), 1,1,2,2-tetrafluoroethyl-2,2,3,3-tetrafluoropropyl ether (TTE), sulfolane (SL) and fluoroethylene carbonate (FEC) in an amount (x) of 0<x≤15 vol. %, wherein SL/LiTFSI is comprised in a molar ratio (y) of 1≤y≤5 and wherein TTE/LiTFSI is comprised in a molar ratio (z) of 1≤z≤5, wherein vol. % is defined as the volume of a specific constituent divided by the total volume of LiTFSI (M: 287.08 g/mol, ρ: 1.33 g/cm$^3$), FEC (M: 106.05 g/mol, ρ: 1.45 g/cm$^3$), and SL (M: 120.17 g/mol, ρ: 1.26 g/cm$^3$), TTE (M: 232.07 g/mol; ρ: 1.54 g/cm$^3$).

DETAILED DESCRIPTION OF THE INVENTION

Figure 1:
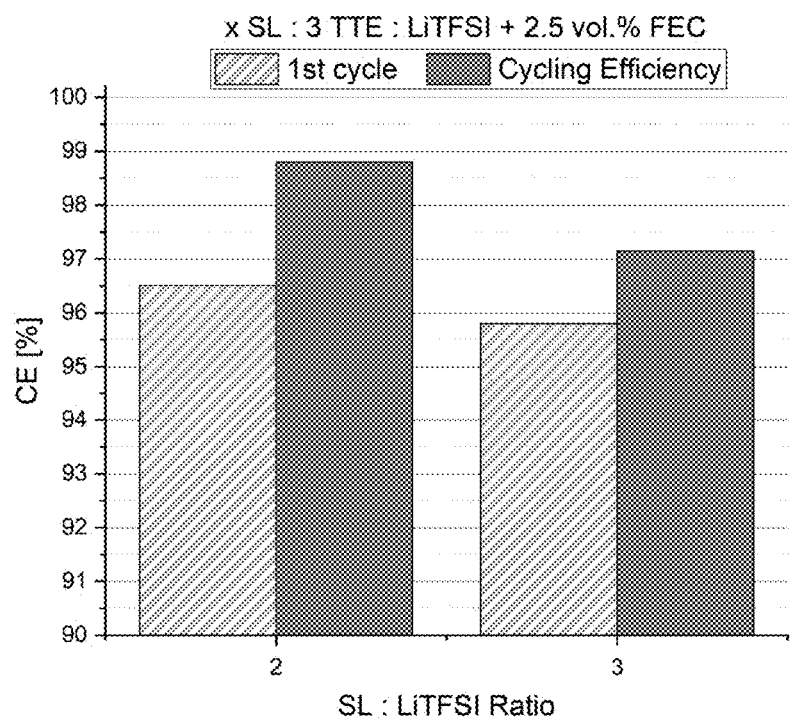
FIG. 1: Experimental results on the relationship between cycling efficiency and varying molar ratios between sulfolane (SL) and a fixed molar ratio of 3.0:1.0 of 1,1,2,2-tetrafluoroethyl-2,2,3,3-tetrafluoropropyl ether (TTE) and lithium bis(trifluoromethansolfonyl)imide (LiTFSI) and at fixed 2.5 vol. % fluoroethylene carbonate (FEC) content.

In a first aspect, the present invention relates to a sulfolane (SL)-based composition suitable for lithium secondary batteries, comprising lithium bis(trifluoromethansolfonyl)imide (LiTFSI), 1,1,2,2-tetrafluoroethyl-2,2,3,3-tetrafluoropropyl ether (TTE), sulfolane (SL) and fluoroethylene carbonate (FEC) in an amount (x) of 0<x≤15 vol. %.

Preferably, said sulfolane (SL)-based composition comprises LiTFSI and SL, wherein SL/LiTFSI is comprised in a molar ratio (y) of 1.0≤y≤5.0 and wherein TTE/LiTFSI is comprised in a molar ratio (z) of 1.0≤z≤5.0.

For the sake of clarity, a skilled person is able to calculate the vol. % or volume percentage of each for the herein-described ingredients and molar ratios between each of the herein-described ingredients from the physical data available for each of the herein-described ingredients.

For the sake of clarity, the vol. % or volume percentage is herein based on the total volume of the electrolyte composition unless stated otherwise.

According to the present invention, the electrolyte composition comprises lithium bis(trifluoromethansolfonyl)imide (LiTFSI). LiTFSI is a well-known chemical compound (CAS: 90076-65-6).

According to the present invention, the electrolyte composition further comprises fluoroethylene carbonate (FEC) in an amount (x) of $0 < x \leq 15$ vol. %, relative to the total volume of the composition. Depending on the respective amounts of SL, LiTFSI and TTE in the composition, said electrolyte composition comprises fluoroethylene carbonate (FEC) in an amount (x') of $0 < x' \leq 13.4$ wt. %, relative to the total weight of the composition. FEC is a well-known chemical compound (CAS: 114435-02-8).

Preferably, FEC is present in amounts (x) of 0.1 vol. %≤x, 0.1 vol. %<x, 0.5 vol. %≤x, 0.5 vol. %<x, 1.0 vol. %≤x or 1.0 vol. %<x, relative to the total volume of the composition. Depending on the respective amounts of SL, LiTFSI and TTE in the composition, said electrolyte composition corresponds to an electrolyte composition comprises fluoroethylene carbonate (FEC) in an amount (x') of about 0.09 wt. %≤x' or 0.09 wt. %<x', 0.4 wt. %≤x', 0.4 wt. %<x', 0.9 wt. %≤x' or 0.9 wt. %<x', relative to the total weight of the composition.

Preferably, FEC is present in amounts (x) of x≤15.0 vol. %, x<15.0 vol. %, x≤10.0 vol. %, x<10.0 vol. %, x≤5.0 vol. %, x<5.0 vol. %, x≤2.5 vol. % or x<2.5 vol. % or even x≤2.0 vol. %, x<2.0 vol. %, relative to the total volume of the composition. Depending on the respective amounts of SL, LiTFSI and TTE in the composition, said electrolyte composition corresponds to an electrolyte composition comprising fluoroethylene carbonate (FEC) in an amount (x') of about x'≤13.4 wt. %, x'≤13.4 wt. %, x'≤8.8 wt. %, x'<8.8 wt. %, x'≤4.4 wt. % or x'<4.4 wt. %, x'≤2.2 wt. % or x'<2.2 wt. % or x'≤1.8 wt. % or x'<1.8 wt. %, relative to the total weight of the composition.

In a preferred embodiment, FEC is comprised in an amount (x) of 0.5 to 5.0 vol. %, relative to the total volume of the composition. Depending on the respective amounts of SL, LiTFSI and TTE in the composition, said electrolyte composition corresponds to an electrolyte composition comprising fluoroethylene carbonate (FEC) in an amount (x') of about 0.4 to about 4.4 wt. %, %, relative to the total weight of the composition. In a more preferred embodiment, FEC is comprised in an amount (x) of 1.0 to 2.0 vol. %, corresponding to an amount (x') of about 0.9 to about 1.8 wt. %.

According to the present invention, the electrolyte composition further comprises sulfolane (SL). SL is a well-known chemical compound (CAS: 126-33-0).

According to the present invention, the electrolyte composition comprises SL/LiTFSI in a molar ratio (y) of $1.0 \leq y \leq 5.0$.

Preferably, the electrolyte composition comprises SL/LiTFSI in a molar ratio (y) of 1.0≤y, 1.0<y, 1.5≤y or 1.5<y.

Preferably, the electrolyte composition comprises SL/LiTFSI in a molar ratio (y) of y≤5.0, y<5.0, y≤3.0, y<3.0, y≤2.5 or y<2.5.

In a preferred embodiment, SL/LiTFSI may be comprised in a molar ratio (y) of $1.0 \leq y \leq 5.0$. In a more preferred embodiment, SL/LiTFSI may be comprised in a molar ratio (y) of $1.0 \leq y \leq 3.0$. In an even more preferred embodiment, SL/LiTFSI may be comprised in a molar ratio (y) of $1.5 \leq y \leq 2.5$.

According to the present invention, the electrolyte composition further comprises 1,1,2,2-tetrafluoroethyl-2,2,3,3-tetrafluoropropyl ether (TTE). TTE is a well-known chemical compound (CAS: 16627-68-2).

According to the present invention, the electrolyte composition comprises TTE/LiTFSI in a molar ratio (z) of $1.0 \leq z \leq 5.0$.

Preferably, the electrolyte composition comprises TTE/LiTFSI may be comprised in a molar ratio (z) of 1.0<z, 2.0≤z, 2.0<z, 2.5≤z or 2.5<z.

Preferably, the electrolyte composition comprises TTE/LiTFSI may be comprised in a molar ratio (z) of z<5.0, z≤3.5, z<3.5, z≤3.0 or z<3.0.

In a preferred embodiment, TTE/LiTFSI may be comprised in a molar ratio (z) of $1 < z < 5.0$. In a more preferred embodiment, TTE/LiTFSI may be comprised in a molar ratio (z) of $2.0 \leq z \leq 3.5$. In an even more preferred embodiment, TTE/LiTFSI may be comprised in a molar ratio (z) of $2.5 \leq z \leq 3.0$.

In a preferred embodiment, the electrolyte composition may comprise fluoroethylene carbonate (FEC) in an amount (x) of $0.1 \leq x \leq 10$ vol. %, relative to the total volume of the composition. Depending on the respective amounts of SL, LiTFSI and TTE in the composition, said electrolyte composition comprises fluoroethylene carbonate (FEC) in an amount (x') of 0.09 to 8.8 wt. %, relative to the total weight of the composition, SL/LiTFSI in a molar ratio (y) of $1.0 \leq y < 5.0$ and TTE/LiTFSI in a molar ratio (z) of $1.0 < z < 5.0$.

In a particularly preferred embodiment, the electrolyte composition may comprise fluoroethylene carbonate (FEC) in an amount of 0.5 to 5 vol. %, relative to the total volume of the composition. Depending on the respective amounts of SL, LiTFSI and TTE in the composition, said electrolyte composition comprises fluoroethylene carbonate (FEC) in an amount (x') of 0.4 to 4.4 wt. %, relative to the total weight of the composition, SL/LiTFSI in a molar ratio (y) of $1.0 \leq y \leq 3.0$ and TTE/LiTFSI in a molar ratio (z) of $2.0 \leq z \leq 3.5$.

In a particularly preferred embodiment, the electrolyte composition may comprise fluoroethylene carbonate (FEC) in an amount of 1.0 to 2.0 vol. %, relative to the total volume of the composition. Depending on the respective amounts of SL, LiTFSI and TTE in the composition, said electrolyte composition comprises fluoroethylene carbonate (FEC) in an amount (x') of 0.9 to 1.8 wt. %, relative to the total weight of the composition, and SL/LiTFSI in a molar ratio (y) of $1.5 \leq y \leq 2.5$ and TTE/LiTFSI in a molar ratio (z) of $2.5 \leq z \leq 3.0$.

In a preferred embodiment, the electrolyte composition comprises sulfolane (SL) and TTE, whereby SL and TTE are comprised in a molar ratio (y/z) of $2.0 \leq y/z \leq 3.0$, preferably in a molar ratio (y/z) of $2.0 \leq y/z < 3.0$, and more preferably in a molar ratio (y/z) of $2.0 \leq y/z \leq 2.5$.

In a preferred embodiment, the electrolyte composition comprises LiTFSI, TTE, SL and FEC in an amount of at least 90 vol. %, relative to the total volume of the composition, and more preferably in an amount of at least 95 vol. %, or even at least 99 vol. %. Most preferably said composition consists essentially of LiTFSI, TTE, SL and FEC.

The way of preparing the electrolyte composition is not particularly limited, i.e. it can be for example prepared by mixing the ingredients.

The present invention also relates to a lithium secondary battery cell comprising the electrolyte composition according to the invention. For the sake of clarity, the lithium secondary battery cell comprises at least an anode, a cathode and an electrolyte, and optionally a separator. The electrolyte relates to the electrolyte according to the present invention described herein above.

The material of the cathode is not particularly limited, and examples thereof include a transition metal compound having a structure capable of diffusing lithium ions, or a specialized metal compound thereof and an oxide of lithium. Specifically, $LiCoO_2$, $LiNiO_2$, $LiMn_2O_4$, $LiFePO_4$, etc. can be mentioned. Preferred cathode materials are mixed metal oxides comprising lithium, nickel and optionally manganese, cobalt and/or aluminium.

The cathode can be formed by press-moulding the cathode material listed above together with a known conductive auxiliary agent or binder, or the positive electrode active material together with a known conductive auxiliary agent or binder into an organic solvent such as pyrrolidone. It can be obtained by applying a mixture and pasting it to a current collector such as an aluminium foil, followed by drying.

In a preferred embodiment, the cathode is a copper foil (cathode) vs lithium foil (anode).

The material of the anode is not particularly limited as long as it is a material capable of plating-stripping or inserting-extracting lithium. For example, any current collector, such as Cu, Ni or carbon based electrode, lithium metal, Sn—Cu, Sn—Co, Sn—Fe or Sn—An alloy such as —Ni, a metal oxide such as $Li_4Ti_5O_{12}$ or $Li_5Fe_2O_3$, a natural graphite, an artificial graphite, a boronized graphite, a mesocarbon microbead, a carbon material such as a pitch-based carbon fiber graphitized material, carbon-Si composite or a carbon nanotube.

A separator is usually interposed between the cathode and the anode in order to prevent a short circuit between the cathode and the anode. The material and shape of the separator is not particularly limited, but it is preferable that the electrolyte composition can easily pass therethrough and that the separator is an insulator and a chemically stable material. Examples thereof include microporous films and sheets made of various polymer materials. Specific examples of the polymer material include polyolefin polymers, nitrocellulose, polyacrylonitrile, polyvinylidene fluoride, polyethylene, and polypropylene. From the viewpoints of electrochemical stability and chemical stability, polyolefin polymers are preferred.

In a preferred embodiment, the separator is a Polypropylene separator with a thickness of 40.0 μm and porosity of 48% (e.g. Cellguard 2075-1500M). Such a separator is described in the following article: International Journal of Electrochemistry, Volume 2018, Article ID 1925708, 7 pages, https://doi.org/10.1155/2018/1925708.

The optimum working voltage of the lithium secondary battery of the present invention is not particularly limited by the combination of the positive electrode and the negative electrode, but can be used at an average discharge voltage of 2.4 to 4.5 V. Preferably, the lithium secondary battery cell has a high operating voltage, i.e. an operating voltage superior or equal to 4.4 V and preferably inferior or equal to 4.5 V.

In a second aspect, the present invention relates to an electrochemical cell, comprising: a positive electrode; a negative electrode; and a liquid electrolyte comprising: lithium bis(trifluoromethansolfonyl)imide (LiTFSI), 1,1,2,2-tetrafluoroethyl-2,2,3,3-tetrafluoropropyl ether (TTE), sulfolane (SL), and fluoroethylene carbonate (FEC) in an amount (x) of 0<x≤15 vol. %, whereby said electrochemical cell has a coulombic efficiency of at least 93%, measured by electro-plating 3.36 $mAh/cm^2$ of lithium on a negative electrode, preferably a copper foil, and electro-stripping 0.43 $mAh/cm^2$ of lithium from an amount of lithium electroplated on said negative electrode, preferably said copper foil, and repeating the process at for 50 cycles, followed by a final electro-stripping step until the potential reaches +0.5 V. Preferably, said coulombic efficiency is at least 95%, more preferably at least 97% and most preferably at least 98%. Preferably, said current collector comprises a copper foil.

In a preferred embodiment, the present invention provides an electrochemical cell according to the second aspect of the invention, said electrochemical cell comprising a liquid electrolyte according to the first aspect of the invention.

EXAMPLES

1. Description of Coin Cell Preparations

Tested cells where coin cell types CR2025. The cells where prepared by stacking positive casing, positive electrode (pre-soaked in electrolyte), Cellguard-separator, 50 μL electrolyte droplet, negative electrode, spacer, wave-type spring and negative casing on top of each other in that order. Crimping was done with a manual crimping press from MTI corp. at 80 $kg/cm^2$ pressure.

The electrolyte composition is obtained by adding fluoroethylene carbonate (FEC) in an amount (x) of 0.0<x≤5.0 vol. % with respect to the total volume of the electrolyte, sulfolane (SL) and lithium bis(trifluoromethansolfonyl)imide (LiTFSI) in a SL/LiTFSI molar ratio (y) of 5.0 to 1.0 and 1,1,2,2-tetrafluoroethyl-2,2,3,3-tetrafluoropropyl ether (TTE) and LiTFSI in a SL/LiTFSI molar ratio (z) of 5.0 to 1.0.

2. Passivation Protocol

The passivation of the lithium samples was done by two steps. First, the cell described in the Section 1 above was constructed such that the cell was symmetric (Li metal is selected for both the anode and the cathode). Second, the cell was cycled 5 times with a current density of 0.60 $mA/cm^2$ for 2 hours per half cycle, resulting in a capacity of 1.20 $mAh/cm^2$. Afterwards the cells rested for 12 hours before being taken apart and the passivated Li electrodes comprising the SEI are extracted from the lithium cell.

3. Description of Methods for Measuring the Coulombic Efficiency

The coin cell including a passivated lithium electrode is charged and discharged several times under the following conditions to determine their charge-discharge cycle performances: the coulombic efficiency is measured with a Biologic VMP-3 potentiostat using a cell configuration consisting of a copper foil as cathode and a lithium foil as anode. Initially a certain amount of lithium metal (about 1 mg/50 μL of electrolyte corresponding to a capacity of 3.80 mAh) is plated on the copper foil using a constant current of 0.38 $mA/cm^2$ and subsequently completely removed by applying the inverse current up to the potential of 0.50 V, giving $Q_{clean}$ which is used to calculate $1^{st}$ cycle efficiency in FIGS. 1 & 2 through $CE_{1st}=Q_{clean}/Q_{initial}$.

Subsequently another approximately 1 mg/50 μL of electrolyte of lithium metal corresponding to a capacity of 3.80 mAh ($2^{nd}$ $Q_{initial}$) is plated on the copper foil using the same current density.

After this, 50 cycles (n) with the current density of 0.380 $mA/cm^2$ and each cycle cycling 12.5% of the total (3.80 mAh, $Q_{initial}$) capacity (0.475 mAh in our setup) where performed.

After the completion of the $50^{th}$ cycle, the remaining lithium was stripped away from the copper electrode by applying a current density of 0.380 mA/cm² to the cut-off voltage of 0.5 V (giving $Q_{final}$).

The CE was calculated using following general formula:

$$CE = \frac{n \cdot Q_{cycle} + Q_{final}}{n \cdot Q_{cycle} + Q_{initial}}$$

Based on the $Q_{cycle}$, $Q_{initial}$, and n are known (see the description of experiment above) the formula can be simplified to:

$$CE = \frac{23.75 \text{ mAh} + Q_{final}}{27.55 \text{ mAh}}$$

4. Experimental Tests and Results

For testing the relationship of the cycling efficiency to the molar ratio of sulfolane (SL):1,1,2,2-tetrafluoroethyl-2,2,3,3-tetrafluoropropyl ether (TTE):lithium bis(trifluoromethansolfonyl)imide (LiTFSI), the molar ratio was varied from 2:3:1 to 3:3:1. FEC content was kept constant at 2.5 vol. % and the coulombic efficiency was measured in the first charge and discharge cycle and in subsequent charge and discharge cycles. The experimental results are shown in FIG. 1.

FIG. 1 shows that the cycling efficiency of the electrolyte composition depends on the molar ratio of SL/LiTFSI.

The cycling efficiency of the electrolyte according to the invention having a molar ratio of SL/LiTFS from 2:1 shows a significantly high cycling efficiency of over 90%, and significantly higher when compared to an electrolyte according to the invention having a molar ratio of SL/LiTFSI from 3:1. In addition, also initial cycling efficiency is higher for the electrolyte having a molar ratio of SL/LiTFSI of 2:1.

The cycling efficiency of the electrolyte composition according to the invention having a molar ratio of SL/LiTFSI between 2.0 to 2.5 are optimum with a maximum at a molar ratio of SL/LiTFSI of 2.

The cycling efficiency of the electrolyte composition having a molar ratio of SL/LiTFSI of more than 3:1 did significantly decrease to a degree where it was unable to cycle.

For testing the dependency of the cycling efficiency to the amount of fluoroethylene carbonate (FEC), the amount of FEC (based on the volume percentage to the total volume of the electrolyte composition) was varied from 0 to 15 vol. % in steps of 1 vol. % while keeping the molar ratio of SL:TTE:TFSI constant at 3:3:1 and the coulombic efficiency was measured electrolyte in the first charge and discharge cycle and in subsequent charge and discharge cycles. The experimental results are shown in FIG. 2.

Figure 2:
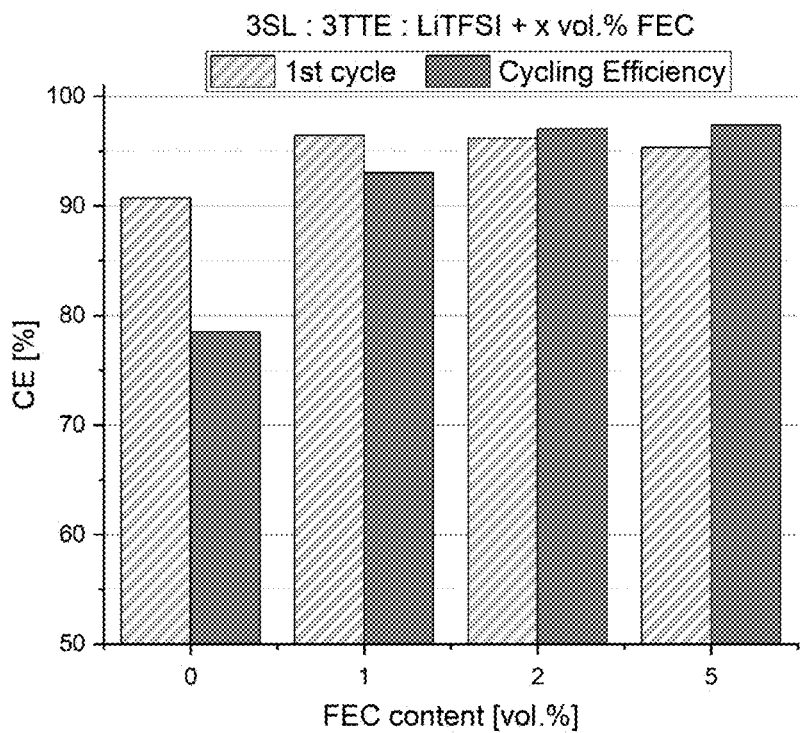
FIG. 2: Experimental results on the relationship between cycling efficiency and varying vol. % of fluoroethylene carbonate (FEC) at a fixed molar ratio between sulfolane (SL), 1,1,2,2-tetrafluoroethyl-2,2,3,3-tetrafluoropropyl ether (TTE) and lithium bis(trifluoromethansolfonyl)imide (LiTFSI) of 3.0:3.0:1.0.

FIG. 2 shows that the cycling efficiency of the electrolyte composition depends on the amount of FEC added.

The cycling efficiency of the electrolyte according to the invention having a molar ratio of shows a significant high cycling efficiency of over 90%.

The cycling efficiency of the electrolyte composition according to the invention having 2 vol. %, 5 vol. % FEC has an optimum (the experimental results for the ranges up to 15 vol. % FEC are identical to 5 vol. % FEC and, thus, have been omitted for the sake of readability).

The cycling efficiency of the electrolyte composition having more than 15 vol. % FEC significantly dropped and lead to unstable lithium plating behaviour and cell failure.

The results depicted in FIGS. 1 and 2 are summarized in Tables 1 and 2 below:

TABLE 1

Impact of molar ratio of SL/LiTFSI on the Coulombic efficiency.

| SL/LiTFSI | 1st cycle CE (%) | CE (%) |
| --- | --- | --- |
| 2.0 | 96.5 | 98.8 |
| 3.0 | 95.8 | 97.2 |

TABLE 2

Impact of FEC content on Coulombic efficiency.

| FEC vol. % | 1st cycle CE (%) | CE (%) |
| --- | --- | --- |
| 0.0 | 90.8 | 78.5 |
| 1.0 | 96.4 | 93.1 |
| 2.0 | 96.2 | 97.1 |
| 5.0 | 95.4 | 97.4 |

The invention claimed is:

1. An electrochemical cell, comprising:
a positive electrode;
a negative electrode; and
a liquid electrolyte comprising:
lithium bis(trifluoromethansolfonyl)imide (LiTFSI),
1,1,2,2-tetrafluoroethyl-2,2,3,3-tetrafluoropropyl ether (TTE),
sulfolane (SL), and
fluoroethylene carbonate (FEC) in an amount (x) of $1 < x \leq 5$ vol. %,
wherein the electrolyte comprises LiTFSI, TTE, SL and FEC in an amount of at least 90 vol. %, relative to its total volume, and wherein said electrochemical cell has a coulombic efficiency of at least 93%.

2. Electrochemical cell according to claim 1, wherein said coulombic efficiency is at least 95%.

3. Electrochemical cell according to claim 2, wherein said coulombic efficiency is at least 97%.

4. Electrochemical cell according to claim 3, wherein said coulombic efficiency is at least 98%.

5. Electrochemical cell according to claim 1, having a molar ratio SL/LiTFSI (y) of $1.0 \leq y \leq 5.0$.

6. Electrochemical cell according to claim 1, comprising FEC in an amount (x) of $0.1 \leq x \leq 10$ vol. %.

7. Electrochemical cell according to claim 6, comprising FEC in an amount of 0.5 to 5 vol. %.

8. Electrochemical cell according to claim 7, wherein FEC is comprised in an amount of 1.0 to 2.0 vol. %.

9. Electrochemical cell according to claim 5, having a molar ratio TTE/LiTFSI (z) of $1.0 \leq z \leq 5.0$.

10. Electrochemical cell according to claim 1, having a molar ratio SL/LiTFSI (y) of $1.0 \leq y \leq 3.0$.

11. Electrochemical cell according to claim 10, wherein SL/LiTFSI is comprised in a molar ratio (y) of $1.5 \leq y \leq 2.5$.

12. Electrochemical cell according to claim 1, having a molar ratio TTE/LiTFSI (z) of $1.0 < z < 5.0$.

13. Electrochemical cell according to claim 12, having a molar ratio TTE/LiTFSI (z) of $2.0 \leq z \leq 3.5$.

14. Electrochemical cell according to claim 13, having a molar ratio TTE/LiTFSI (z) of $2.5 \leq z \leq 3.0$.

15. Electrochemical cell according to claim 1, wherein a molar ratio SL/TTE (y/z) is $2.0 \leq y/z \leq 3.0$.

16. Electrochemical cell according to claim 1, wherein said a positive electrode comprises a positive electrode active material selected from lithium nickel-manganese-cobalt oxide, lithium nickel-manganese oxide, lithium nickel-cobalt-aluminium oxide, lithium cobalt oxide, lithium iron phosphate, lithium iron manganese phosphate, lithium iron cobalt phosphate, lithium sulphide, sulphur, and aluminium.

17. Electrochemical cell according to claim 16, wherein said a positive electrode comprises a positive electrode active material selected from lithium nickel-manganese-cobalt oxide and lithium nickel-cobalt-aluminium oxide.

18. Electrochemical cell according to claim 1, wherein said a negative electrode comprises a material selected from lithium, nickel, silicon, titanium, silver, bismuth, stainless steel, copper, and alloys thereof, and graphite.

19. Electrochemical cell according to claim 18, wherein said a negative electrode comprises lithium or copper.

20. The electrochemical cell of claim 1, wherein coulombic efficiency is measured by electro-plating 3.36 mAh/cm$^2$ of lithium on a negative electrode and electro-stripping 0.43 mAh/cm$^2$ of lithium from an amount of lithium electro-plated on said negative electrode and repeating the process at for 50 cycles, followed by a final electro-stripping step until the potential reaches +0.5 V.

* * * * *